US005459763A

United States Patent [19]
Hori et al.

[11] Patent Number: 5,459,763
[45] Date of Patent: Oct. 17, 1995

[54] NAVIGATION MESSAGE RECEIVER FOR GLOBAL POSITIONING SYSTEM

[75] Inventors: Katsuya Hori, Kanagawa; Eiichiro Morinaga, Tokyo, both of Japan

[73] Assignee: Sony Corporation, Tokyo, Japan

[21] Appl. No.: 981,454

[22] Filed: Nov. 25, 1992

[30] Foreign Application Priority Data

Nov. 29, 1991 [JP] Japan ................................... 3-316847

[51] Int. Cl.⁶ ..................................................... H04L 7/00
[52] U.S. Cl. ....................... 375/354; 375/367; 370/104.1; 370/105.2; 370/107
[58] Field of Search .................................. 375/1, 94, 106, 375/115, 75; 364/449; 342/352, 386; 370/104.1, 105.1, 105.2, 107

[56] References Cited

U.S. PATENT DOCUMENTS

| 4,613,977 | 9/1986 | Wong et al. | 375/115 |
|---|---|---|---|
| 4,701,939 | 10/1987 | Stutt et al. | 375/115 |
| 4,800,577 | 1/1989 | Tachita et al. | 375/94 |
| 4,968,981 | 11/1990 | Sekine et al. | 375/115 |

*Primary Examiner*—Stephen Chin
*Assistant Examiner*—Don Vo
*Attorney, Agent, or Firm*—Lise A. Rode; Jerry A. Miller

[57] ABSTRACT

Signals representing navigation messages from four GPS artificial satellites are received by a GPS receiver and supplied to receiving processors of respective channels, which spectrally reverse-spread and demodulate the signals by way of PSK to produce the navigation messages. The navigation messages are then supplied to a CPU that determines the position of the GPS receiver using satellite time and orbit data contained in the navigation messages. The CPU determines whether each channel is synchronized or not based on the level of a spectrally reverse-spread output (correlated output) signal. If a channel is out of synchronism, the CPU effects a synchronization process. After the synchronization process, the CPU obtains time base data equal to or higher than a bit number. To obtain such time base data in a channel after the synchronization process, the CPU uses time base data equal to or higher than a bit number of another channel that has already been synchronized. Since a preamble is not detected to produce time base data equal to or higher than a bit number, the synchronization process can be effected in a short period of time.

23 Claims, 6 Drawing Sheets

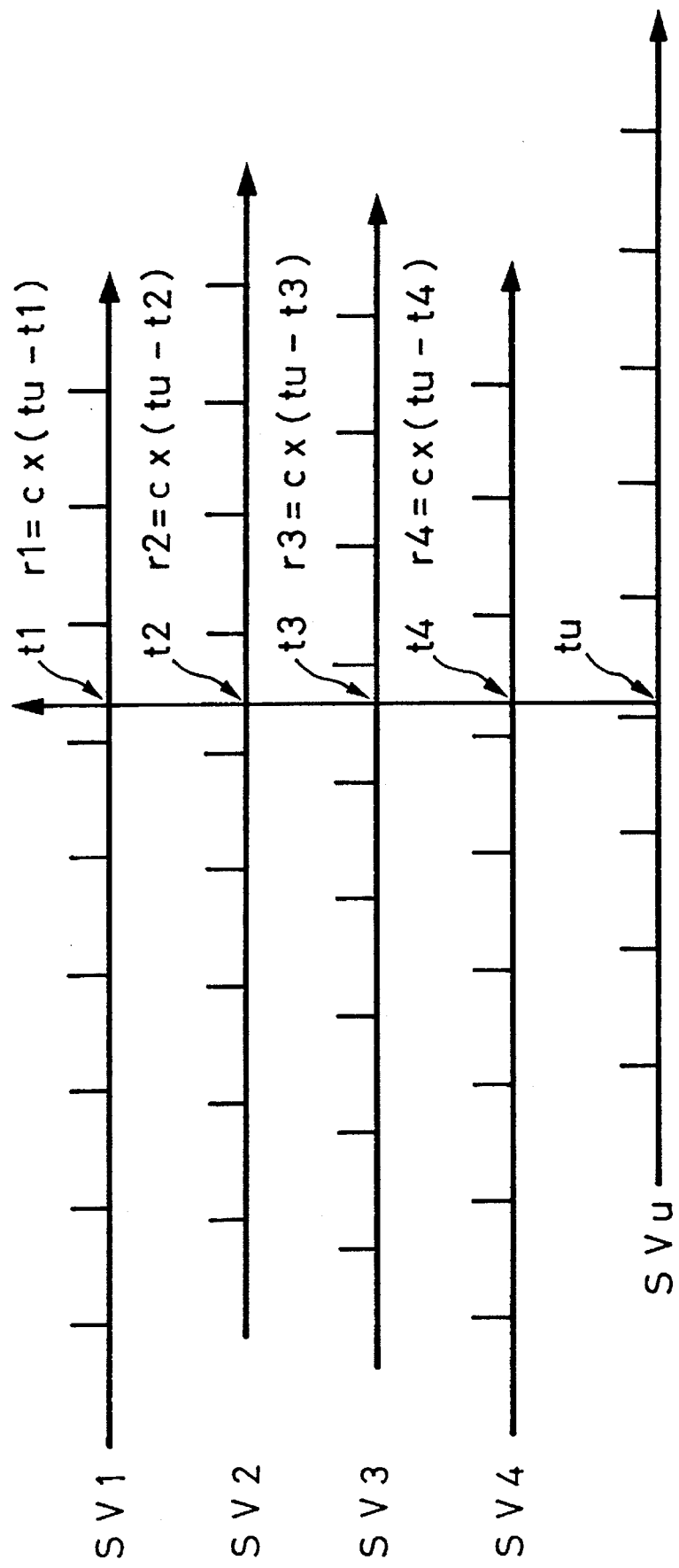

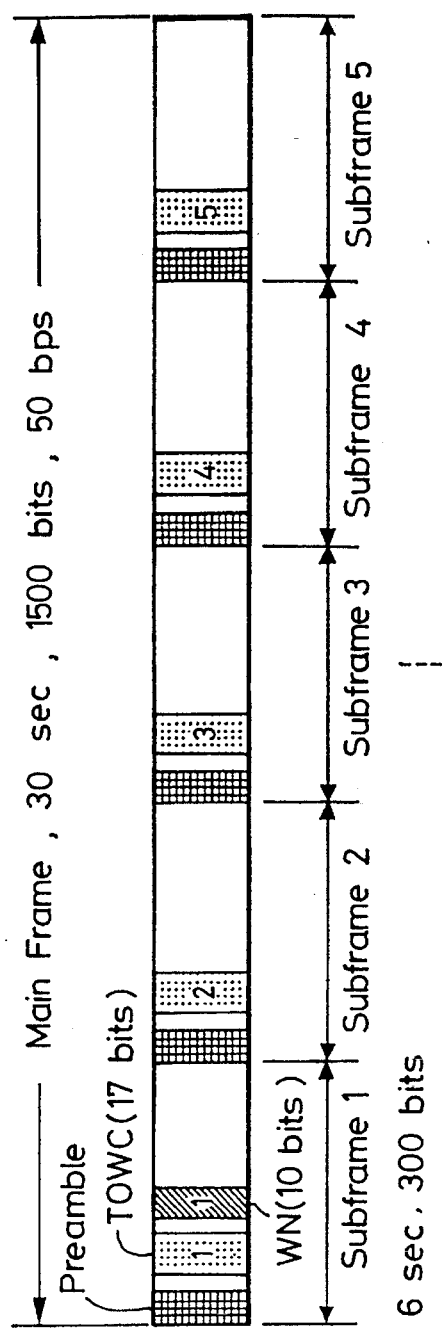
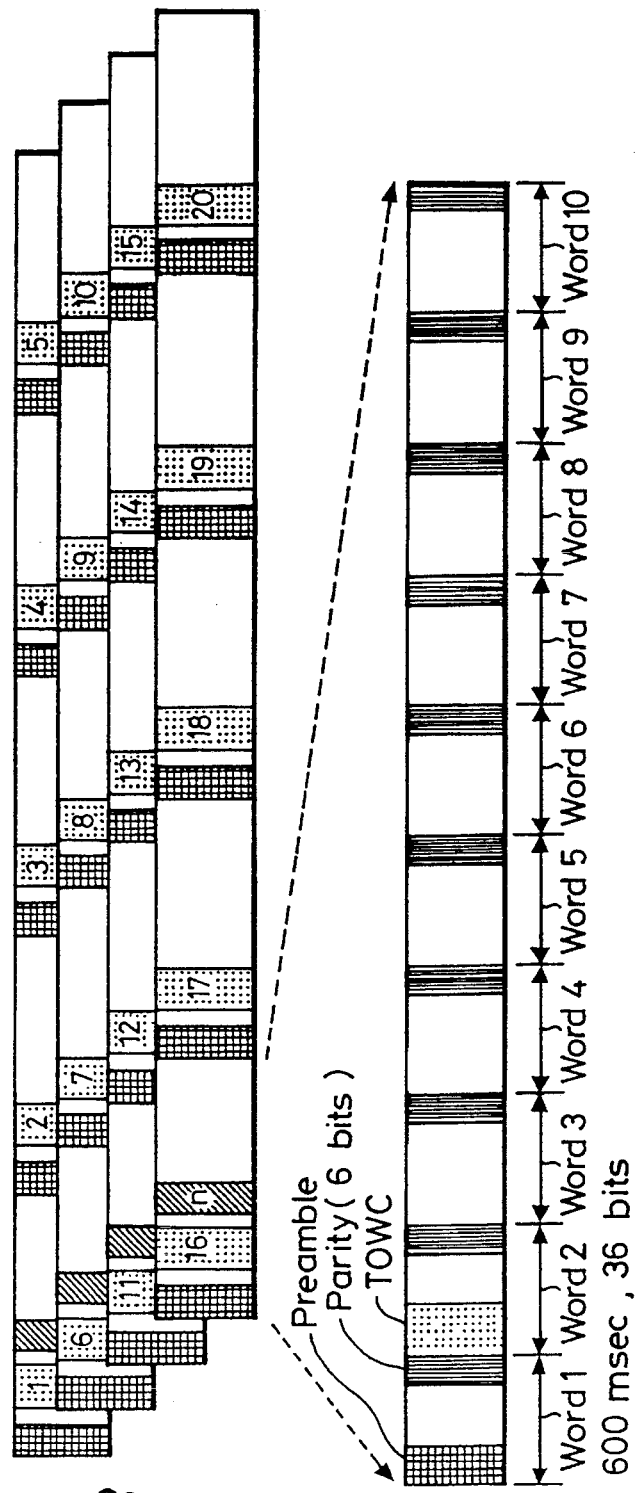
FIG. 2A (1st Week)
FIG. 2B (nth Week)
FIG. 2C Subframe

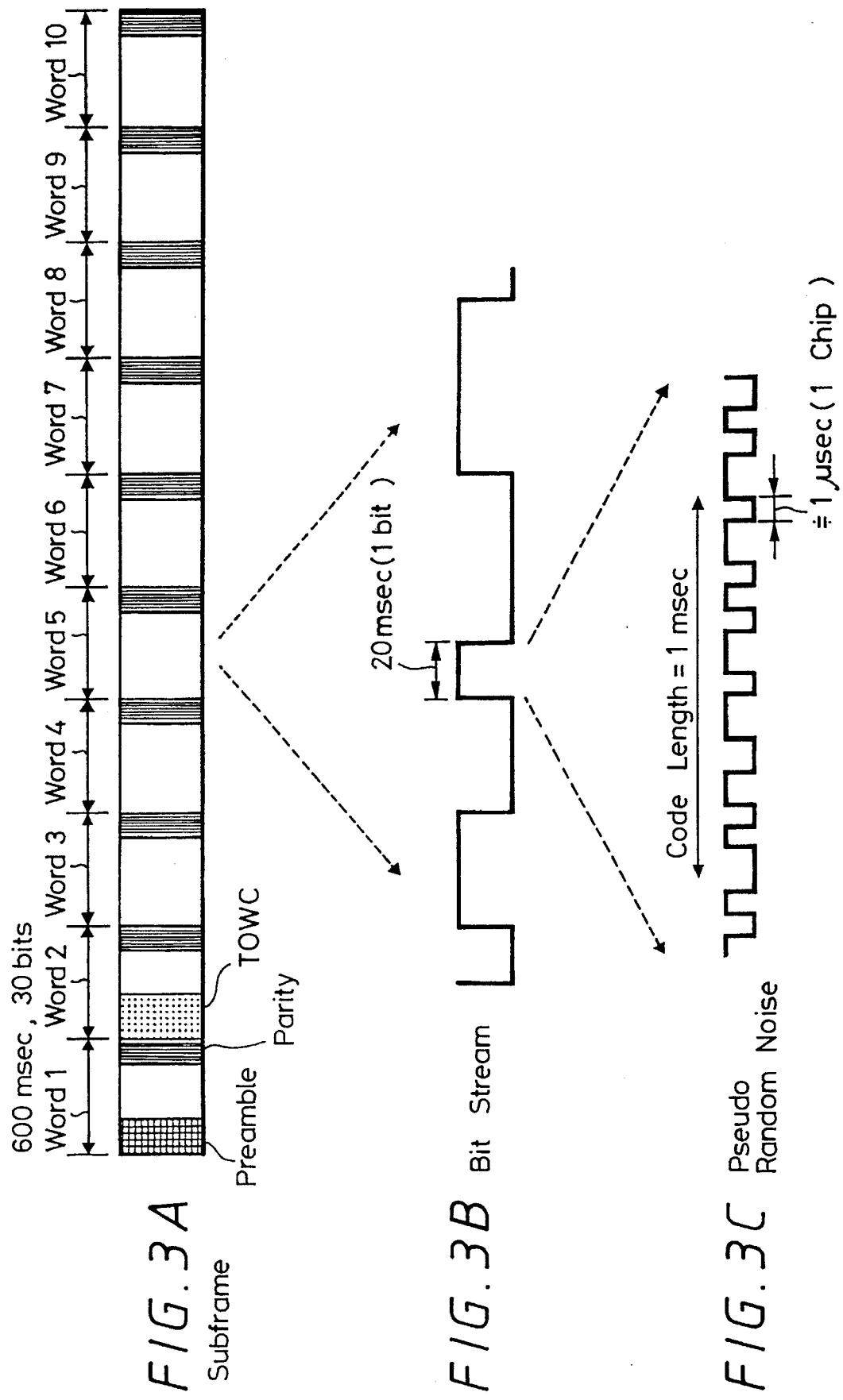

NAVIGATION MESSAGE RECEIVER FOR GLOBAL POSITIONING SYSTEM

BACKGROUND OF THE INVENTION

1. Field of the Invention

The present invention relates to a receiver for receiving navigation messages such as satellite time data, satellite orbit data, etc. from artificial satellites in a global positioning system to determine the position of a user of the global positioning system.

2. Description of the Prior Art

There are known global positioning systems (GPS) for determining the position of a user based on navigation messages from a plurality of artificial satellites orbiting around the earth.

Each of the artificial satellites transmits a signal which is produced by spectrally spreading a navigation message with pseudo random noise (having a chip frequency of 1.023 MHz) and modulating a carrier (having a frequency of 1,575.42 MHz or 1227.6 MHz) with the spectrally spread signal by way of phase-shift keying (PSK).

Since the artificial satellites employ pseudo random noise of different code patterns, a GPS receiver can separately receive the navigation messages from the respective artificial satellites by using pseudo random noise of corresponding code patterns.

A process of determining the position (xu, yu, zu) of a user based on navigation messages from four artificial satellites will be described below.

As well known in the art, the navigation message from each artificial satellite contains satellite time data, satellite orbit data, etc. Each artificial satellite keeps a GPS time scale which is atomic time. The GPS time scale is started from 0 o'clock, coordinated universal time (UTC), Jan. 6, 1980 as 0 o'clock, GPS time, Jan. 6, 1980.

As shown in FIG. 1 of the accompanying drawings, the time bases according to the time data contained in the navigation messages from the respective artificial satellites are indicated by SV1, SV2, SV3, SV4, respectively, and the time base according to the time data of the user is indicated by SVu. When the data from the artificial satellites are received by the user at a time tu, these data have been transmitted from the respective artificial satellites at times t1, t2, t3, t4, respectively.

Therefore, distances r1, r2, r3, r4 from the user position (xu, yu, zu) to the respective positions (xi, yi, zi) (i=1, 2, 3, 4) of the artificial satellites are represented by:

$$r1 = C \times (tu - t1),$$
$$r2 = C \times (tu - t2),$$
$$r3 = C \times (tu - t3),$$
$$r4 = C \times (tu - t4) \tag{1}$$

where C is the speed of light.

From the above equations (1), there are derived four equations (2) given below. The positions (xi, yi, zi) (i=1, 2, 3, 4) of the artificial satellites are calculated based on the orbit data contained in the navigation messages from the respective artificial satellites.

$$\sqrt{(x1 - xu)^2 + (y1 - yu)^2 + (z1 - zu)^2} = C(tu - t1), \tag{2}$$
$$\sqrt{(x2 - xu)^2 + (y2 - yu)^2 + (z2 - zu)^2} = C(tu - t2),$$
$$\sqrt{(x3 - xu)^2 + (y3 - yu)^2 + (z3 - zu)^2} = C(tu - t3),$$
$$\sqrt{(x4 - xu)^2 + (y4 - yu)^2 + (z4 - zu)^2} = C(tu - t4).$$

By solving the simultaneous linear equations (2), the user position (xu, yu, zu) can be determined. Since the equations (2) can be calculated with the time tu being unknown, the receiver of the user is not required to have an expensive atomic clock.

The format of the navigation messages from the artificial satellites will be described below with reference to FIGS. 2A, 2B, 2C and 3A, 3B, 3C of the accompanying drawings.

The navigation messages have a bit rate of 50 bps, and have main frames each composed of 1,500 bits. Therefore, it takes 30 seconds to transmit one main frame. Each main frame is divided into five subframes each composed of 300 bits. Therefore, one subframe can be transmitted in 6 seconds.

Each of the subframes includes an 8-bit preamble (synchronizing signal) at its starting end that is followed by a 17-bit subframe number TOWC (Time Of Week Count) which indicates the number of subframes counted from the start of the week. In the subframe 1, the TOWC is followed by a 10-bit WN (Week Number). FIG. 2A shows the first main frame of the first week starting from 0 o'clock, Jan. 6, 1980. FIG. 2B shows first four main frames of the nth week.

As show in FIG. 2C, each subframe is principally composed of 10 words each of 30 bits. It takes 600 msec. to transmit one word. 8 bits at the starting end of the word 1 serve as a preamble, and 17 bits at the starting end of the word 2 serve as TOWC. Each of the words 1 through 10 contains 6 error-correcting parity bits at its terminal end. The parity bits in each word are added for the error correction of the remaining 24 bits of the word and also the last 2 bits of the preceding word.

Since a navigation message has a bit rate of 50 bps, as described above, its bit period is 20 msec. as shown in FIG. 3B. FIG. 3A shows a subframe. The navigation messages of the above format are spectrally spread with pseudo random noise (see FIG. 3C) whose chip frequency is 1.023 MHz. The pseudo random noise has a code length (repetition period) of 1 msec., and the code lengths corresponding to 20 periods are equal to one bit of the navigation message. The period of one chip is approximately 1 μsec.

The GPS receiver which receives the above navigation messages from the artificial satellites calculates the times t1, t2, t3, t4 on the respective time bases SV1, SV2, SV3, SV4 according to the following equation (3):

$$ti = 1980, 1, 6 + (WNi - 1) \times 7 \times 24 \times 3600 \text{ sec.} + \tag{3}$$
$$(TOWi - 1) \times 6 \text{ sec.} + WORDi \times 600 \text{ msec.} +$$
$$BITi \times 20 \text{ msec.} + SEQi \times 1 \text{ msec.} + CHIPi \times 1 \text{ μsec.}$$

where i=1~4.

In the equation (3), the number of words counted is used as a word number WORDi, which is reset to 0 at the starting end of each subframe.

The number of bits counted is used as a bit number BITi, which is reset to 0 at the starting end of each word.

The number of repetition periods counted of the pseudo random noise used in reverse spreading is used as SEQi, which is reset to 0 at the starting end of each bit.

The number of chips counted is used as CHIPi, which is reset to 0 at the starting end of the repetition period of the pseudo random noise.

In the case where the GPS receiver is installed on an automobile, it tends to be brought out of synchronism with the pseudo random noise from the satellites when signals from the satellites are blocked by buildings, standing trees, or other obstacles. When the GPS receiver is out of synchronism with the pseudo random noise from the satellites, since the parameters TOWi, WORDi, BITi, etc. in the equation (3) cannot be determined, the user position (xu, yu, zu) cannot be calculated.

When the GPS receiver is brought out of synchronism with the pseudo random noise from the satellites, therefore, it is necessary to effect a synchronization process to determine the parameters TOWi, WORDi, BITi, etc. in the equation (3).

Whether the GPS receiver is brought out of synchronism or not can be determined by the magnitude of the level of a correlation output signal that is produced by spectrally reverse-spreading the received signals.

The conventional synchronization process is carried out as follows:

It is known that when the magnitude of the level of a correlation output signal that is produced by spectrally reverse-spreading the received signals exceeds a predetermined value, it is determined that the GPS receiver is in synchronism with the pseudo random noise from the satellites, and a bit synchronization process is effected on the basis of a bit stream that is produced by demodulating the output by way of PSK.

However, if it is determined that the receiver is not in synchronization with the pseudo random noise, it must be brought into synchronization. In order to synchronize the GPS receiver with the pseudo random noise, the phase of the pseudo random noise which is multiplied by the signals from the satellites by the spectral reverse spreading is adjusted. The time consumed after the GPS receiver is synchronized with the pseudo random noise until the bit synchronization process is completed is about 20 msec. because the bit period is 20 msec.

Once the bit synchronization is completed, CHIPi is determined from the count of chips of the pseudo random noise, and SEQi is determined from the count of repetition periods of the pseudo random noise with bit edges as a reference.

Then, a preamble is detected from a navigation message (bit stream). Since an 8-bit preamble is positioned at the starting end of each subframe, when a preamble is detected, WORDi and BITi are determined.

The time spent after the bit synchronization is determined until a preamble is detected is at least 6 seconds because the subframe period is 6 seconds.

Thereafter, TOWC is detected from a navigation message, determining TOWi. While the preamble is positioned at the starting end of the word 1, TOWC is positioned at the starting end of the word 2 with the word period being 600 msec. The time spent after the preamble is detected until TOWC is detected is about 600 msec.

Then, WN is detected from a navigation message. Inasmuch as WN is included in every 5 subframes, the time spent after TOWC is detected until WN is detected is at most 30 seconds. WN remains unchanged within the week, and hence the detection of WN is not required for the determination of WNi within the week.

Therefore, when the GPS receiver is brought out of synchronism with the pseudo random noise from the satellites, the parameters TOWi, WORDi, BITi, etc. can be determined by the above synchronization process, and the times ti (i=1–4) can be calculated, so that the user position (xu, yu, zu) can be determined.

The disadvantages with the above synchronization process, however, are that as long as 6 seconds may be required until a preamble is detected after the synchronization is detected, and about 600 msec. are additionally required until TOWC is detected.

In other words, in order to determine the parameters TOWi, WORDi, BITi, etc., as much as a little over 6 seconds are required after the synchronization is achieved. It is thus impossible to determine the user position, i.e., the position of the GPS receiver, before the elapse of those 6 seconds.

OBJECTS AND SUMMARY OF THE INVENTION

It is therefore an object of the present invention to provide a navigation message receiver for use in a global positioning system, which will reduce the period of time in which it is impossible to position the receiver due to the receiver being out of synchronism with pseudo random noise from artificial satellites.

According to the present invention, there is provided a receiver for receiving navigation data in a global positioning system, comprising a plurality of receiving means for synchronizing and demodulating navigation data received in respective channels, each of the receiving means comprising means for effecting a bit synchronization process to synchronize a channel, which has not been synchronized, to produce time data by referring to time data equal to or higher than a bit number of a channel that has already been synchronized.

According to the present invention, there is also provided a method of detecting time data from navigation data received by a receiver in a global navigation system, the receiver having a plurality of receiving means for synchronizing and demodulating navigation data received in respective channels, the method comprising the step of effecting a bit synchronization process to synchronize a channel, which has not been synchronized, to produce time data by referring to time data equal to or higher than a bit number of a channel that has already been synchronized.

To synchronize a channel, time base data equal to or higher than a bit number in a word is not produced by detecting a preamble, but by referring to time base data in another channel that has been synchronized. Therefore, the synchronization process can be carried out in a short period of time. As a consequence, it is possible to reduce a period of time in which it is impossible to position the receiver due to the receiver's being out of synchronism with pseudo random noise from artificial satellites.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

FIG. 1 is a diagram illustrating the manner in which the position of a user is determined;

FIGS. 2A, 2B, and 2C are diagrams showing the format of a navigation message;

FIGS. 3A, 3B, and 3C are diagrams showing the format of the navigation message;

DETAILED DESCRIPTION OF THE PREFERRED EMBODIMENT

Figure 4:
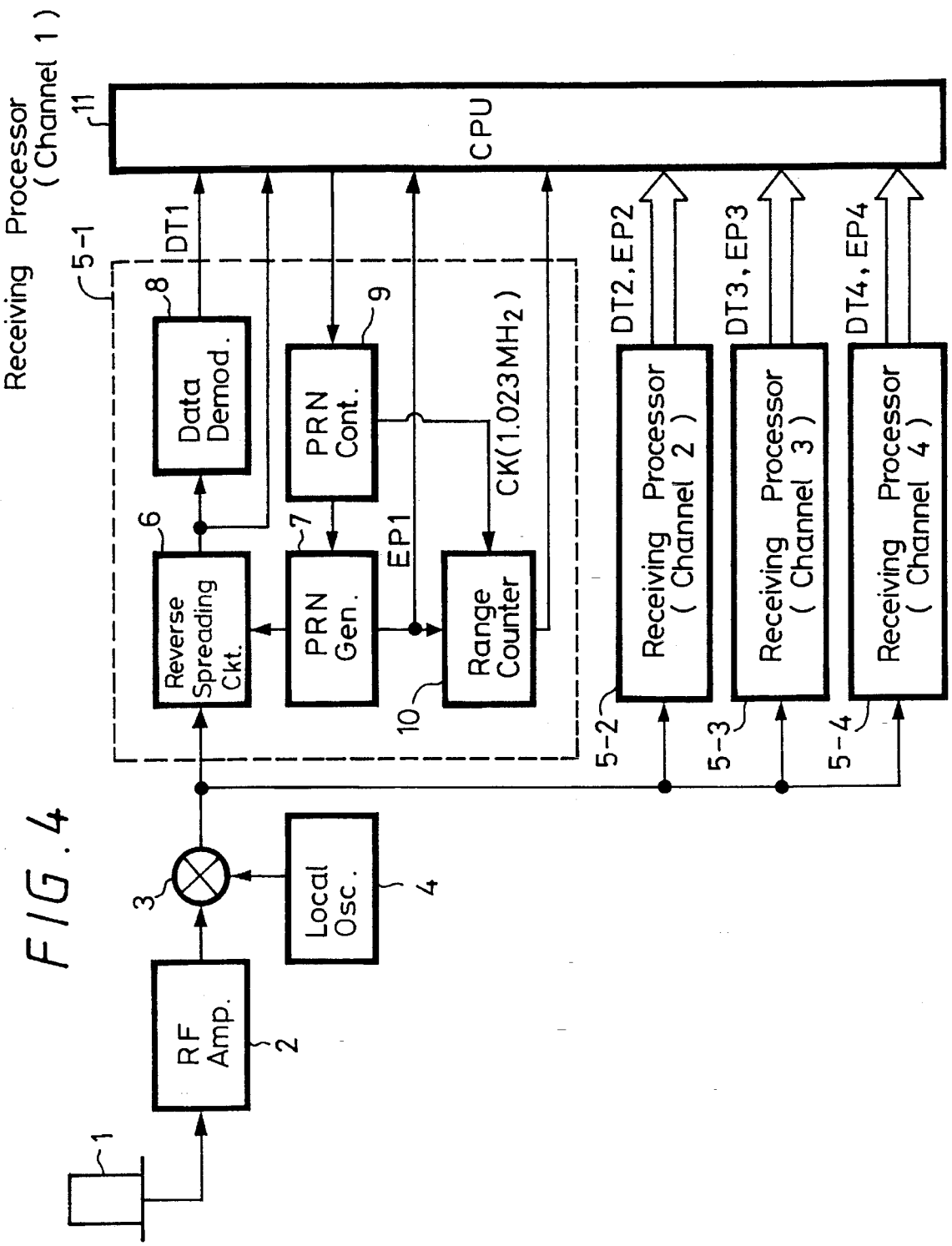
FIG. 4 is a block diagram of a navigation message receiver for use in a global positioning system according to the present invention.

FIG. 4 shows in block form a navigation message receiver for use in a global positioning system according to the present invention. The navigation message receiver receives navigation messages or data from four artificial satellites orbiting around the earth, and hence has four channels.

In FIG. 4, signals indicative of the navigation messages or data from the artificial satellites are amplified by an RF amplifier 2, and then mixed by a mixer 3 with a local oscillating signal from a local oscillator 4.

The mixer 3 produces intermediate frequency signals that are supplied to receiving processors 5-1, 5-2, 5-3, 5-4 of respective channels 1, 2, 3, 4. The receiving processors 5-1, 5-2, 5-3, 5-4 processes the supplied intermediate frequency signals by way of spectral reverse spreading and PSK demodulation to obtain the navigation messages from the first, second, third, and fourth artificial satellites. At this time, the receiving processors 5-1, 5-2, 5-3, 5-4 employ pseudo random noise of respective code patterns used by the first, second, third, and fourth artificial satellites to separately retrieve the navigation messages from the first, second, third, and fourth artificial satellites.

The receiving processor 5-1 will now be described. The intermediate frequency signal from the mixer 3 is supplied to a reverse spreading circuit 6 which spectrally reverse-spreads the intermediate frequency signal using pseudo random noise from a pseudo random noise (PRN) generator 7. The reverse spreading circuit 6 supplies its output signal to a data demodulator 8 which demodulates the signal by way of PSK. The demodulated data, which is the navigation message DT1 from the first artificial satellite, is supplied to a central processing unit (CPU) 11.

The correlated output signal from the reverse spreading circuit 6 is also supplied directly to the CPU 11, which determines whether channel 1 is in synchronism with the pseudo random noise or not based on the supplied correlated output signal. If channel 1 is out of synchronism with the pseudo random noise, the CPU 11 controls the PRN generator 7 through a PRN controller 9 to adjust the phase of the pseudo random noise for thereby bringing channel 1 into synchronism with the pseudo random noise.

The PRN controller 9 produces a clock signal CK having a frequency of 1.023 MHz which is the same as the chip frequency of the pseudo random noise. The clock signal CK is supplied as a clock signal to be counted from the PRN controller 9 to a range counter 10.

The PRN generator 7 also generates a signal (epoch EP1) synchronous with the repetition period of the pseudo random noise. The epoch EP1 is supplied to the CPU 11 and also as a reset signal to the range counter 10. The count of the range counter 10 is supplied as the number of chips counted of the pseudo random noise to the CPU 11.

The CPU 11 counts the epoch EP1 from the PRN generator 7 with a bit edge of the data DT1 being used as a reference, thus counting repetition periods of the pseudo random noise.

Each of the other receiving processors 5-2, 5-3, 5-3 of the respective channels 2, 3, 4 is identical in structure to the receiving processor 5-1 of the channel 1. The receiving processors 5-2, 5-3, 5-3 supply data DT2, DT3, DT4 and epoch EP2, EP3, EP4 to the CPU 11.

Figure 5:
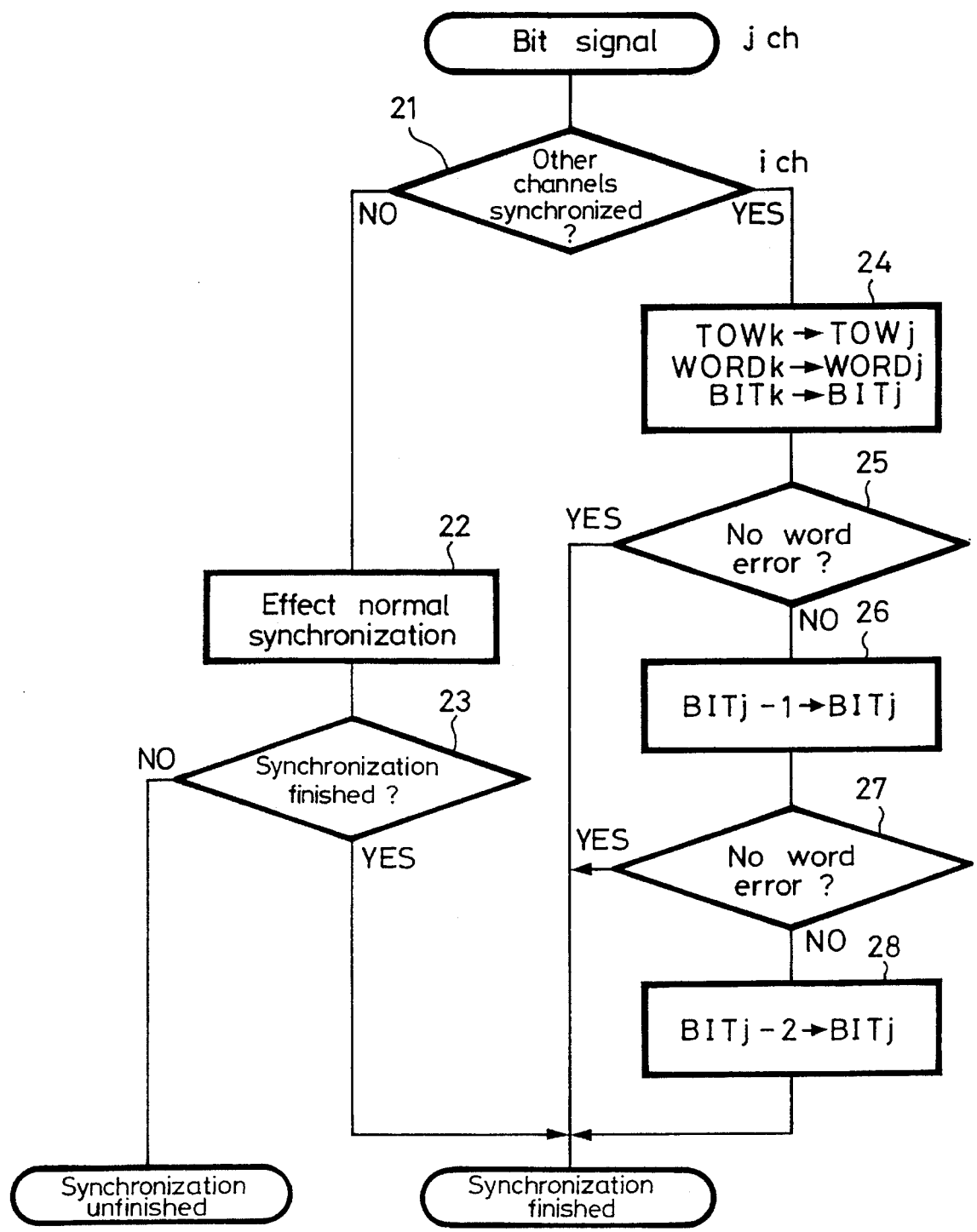
FIG. 5 is a flowchart of a synchronization process of the navigation message receiver shown in FIG. 4.

FIG. 5 further shows a preferred embodiment of the execution of the synchronization process for each channel by the CPU. As described above, the synchronization process is executed in synchronism with a bit signal at each interval of 20 msec. after a synchronized condition of a channel is determined. Again, such synchronization condition is determined based on the correlated output signal from the reverse spreading circuit 6. Once the synchronized condition is determined, a bit synchronization process is effected. The channel synchronization process of the present invention will be described below with respect to a channel j.

First, the CPU 11 determines in a step 21 whether a channel k other than the channel j has been synchronized or not. If not synchronized, the CPU 11 carries out in step 22 the conventional synchronization process based on the detection of a preamble as previously described.

After the step 22, the CPU 11 determines in step 23 whether the parameters are detected up to TOWC and thus whether the synchronization process is finished. If the synchronization process is not finished, then the synchronization process is continuously carried out. If the synchronization process is finished, then the synchronization process comes to an end.

If another channel k has been synchronized in the step 21, then a synchronization process according to the present invention commences. More particularly, the CPU 11 sets parameters TOWk, WORDk, BITk to TOWj, WORDj, BITj, respectively, in a step 24. In order to determine whether newly set BITj is correct or not, the CPU 11 determines whether there is a word error with respect to a word that is distinguished by BITj in a step 25. If no word error is detected, the synchronization process is finished.

If there is a word error in the step 25, then the CPU 11 sets BITj−1 to BITj, i.e., decrements BITj by 1, in a step 26. In order to determine whether newly set BITj is correct or not, the CPU 11 determines whether there is a word error with respect to a word that is distinguished by BITj in a step 26. If no word error is detected, the synchronization process is finished.

If there is a word error in the step 27, the CPU 11 sets BITj+2 to BITj, i.e., increments BITj by 2, in a step 28, and the synchronization process is finished.

Figure 6:
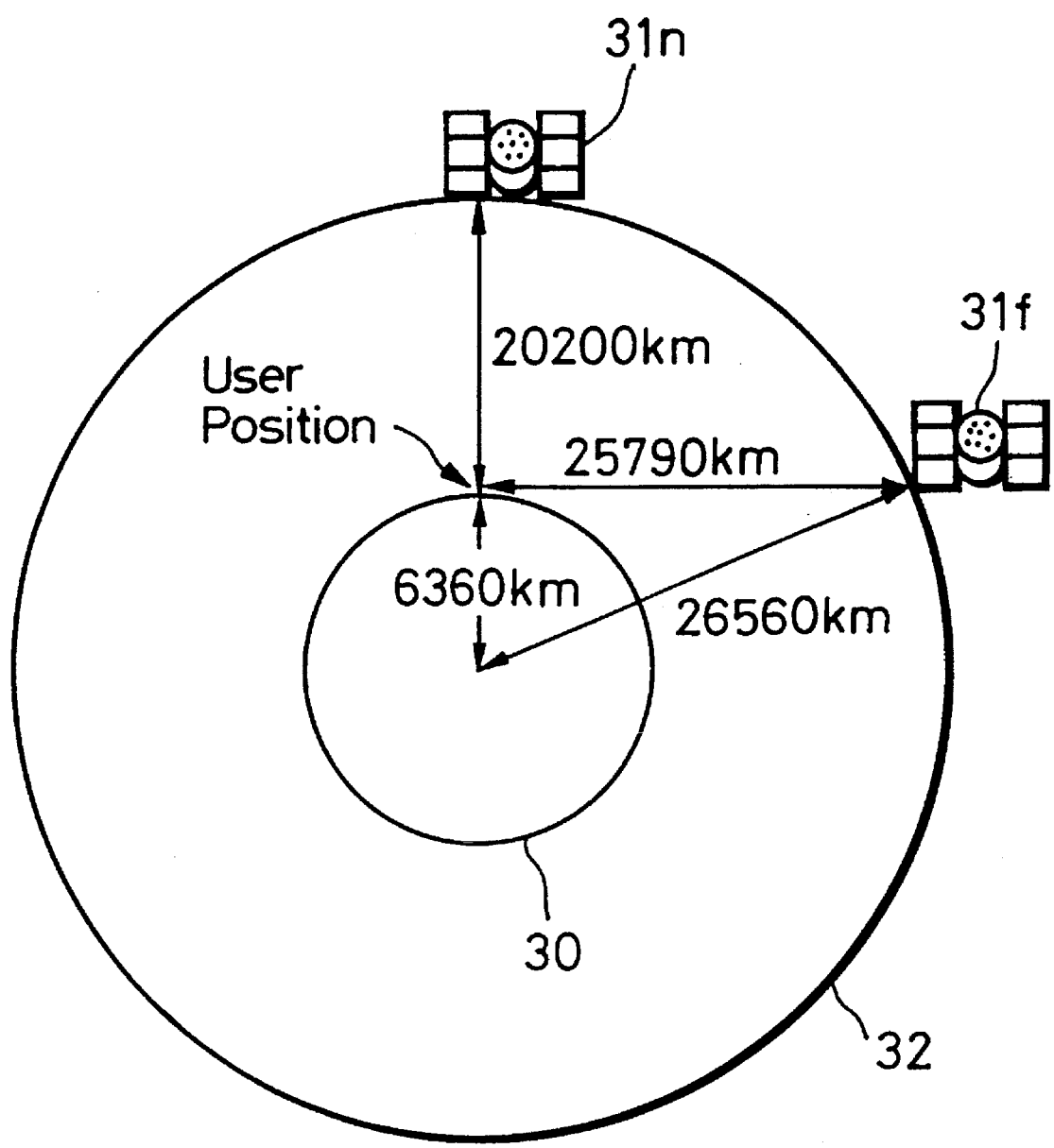
FIG. 6 is a diagram illustrating the difference between wave arrival times from respective artificial satellites that are positioned most closely to and most remotely from the position of the user on the earth.

In steps 26, 28, BITj is decremented and incremented by 1 with respect to BITk for the following reasons:

As shown in FIG. 6, artificial satellites 31n, 31f in the global positioning system move along an orbit 32 around the earth 30. For example, as shown in FIG. 6, the artificial satellite 31n which is closest to the user on the earth 30 is spaced from the user by a distance of 20,200 km, and the artificial satellite 31f which is most remote from the user on the earth 30 is spaced from the user by a distance of 25,790 km. The difference td between wave arrival times from the artificial satellites 31n and 31f to the user is shorter than the bit period (20 msec.) as indicated by the following equation (4):

$$td = (,790-20,200)/C = .65 \text{ msec.}$$

$$C: ,792,458 \text{ m/s (the speed of light)} \quad (4).$$

Consequently, BITj is necessarily equal to either BITk or BITk±1. When BITj is not equal to BITk, BITj can be set correctly simply by incrementing or decrementing by 1 BITj with respect to BITk in the steps 26, 28.

When the synchronization process is required in each of the channels, as when the channel is shifted out of synchronization, the parameters TOWi, WORDi, BITi, etc. in the equation (3) can be determined by carrying out the synchronization process according to the flowchart of FIG. 5. Then, the times ti (ti=~4) are calculated to determine the user position (xu, yu, zu) according to the previously described equations.

As described above, when the synchronization process is to be carried out for a certain channel j, if there is another channel k that has been synchronized, then the time base data equal to or higher in hierarchical order than the bit number of the channel k, i.e., the parameters TOWk, WORDk, BITk are used for the synchronization process of channel; therefore, it is not necessary to detect a preamble to obtain time base data equal to or higher than the bit number, as is the case with the conventional synchronization process. Consequently, the synchronization process can be effected within a shorter period of time in accordance with the present invention, making it possible to reduce the period of time in which it is impossible to position the GPS receiver due to the receiver's being out of synchronism with pseudo random noise from artificial satellites.

In the above embodiment, the bit number BITj is changed successively to BITk, BITk±1 to obtain correct BITj. However, the bit number BITj may be changed in another sequence.

While an error is detected with respect to one word for the determination of the completion of the synchronization process in the illustrated embodiment, an error may be detected with respect to two words or more for higher accuracy.

In the above embodiment, the bit number BITj is changed successively to BITk, BITk±1, and no error detection is effected with respect to the finally set bit number. However, the finally set bit number may also be checked for error. If there is an error with respect to all the set bit numbers, then the bit number may be set to the one with the smallest error, or the range in which the bit number BITj is variable may be widened.

In the illustrated embodiment, the bit number BITj is changed successively to all BITk, BITk±1. Since the position of an artificial satellite for the channel which the user is going to use can be known, either one of BITi±1 is impossible to occur with respect to the bit number BITi, and hence changing the bit number BITi into one of BITi±1 which is impossible to occur may be dispensed with.

While the navigation message receiver in the above embodiment has four channels for receiving navigation messages from four artificial satellites, the principles of the present invention are also applicable to a navigation message receiver having more than four channels.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A receiver having a plurality of channels for receiving in a global positioning system, navigation data, including time base data having a plurality of time parameters, including a first time parameter, said receiver comprising:

means for receiving said navigation data;

modulating means for receiving said navigation data from said receiving means and for providing a modulated output signal representing said navigation data; and, processing means associated with said plurality of channels, said processing means synchronizing any unsynchronized channels of said plurality of channels and demodulating said modulated output signal for each of said synchronized channels;

wherein said time parameters have a hierarchical order, and wherein said processing means determines time base data for any unsynchronized channels by referring to one of said time parameters of said synchronized channels equal to or higher in said hierarchical order than said first time parameter.

2. The receiver of claim 1, wherein said processing means comprises:

pseudo random noise generator means for providing pseudo random noise;

reverse spreading circuit means for spectrally reverse-spreading said modulated signal using said pseudo random noise from said pseudo random noise generator means; and, demodulator means receiving said spectrally reverse spread signal from said reverse spreading circuit means and demodulating same as said navigation data.

3. The receiver of claim 2, further comprising:

control means for receiving an output from said reverse spreading circuit means and for determining whether each channel of said plurality of channels is synchronized with said pseudo random noise from said pseudo random noise generator means; and, pseudo random noise controller means, wherein said control means controls said pseudo random noise controller means to output a clock signal in order to adjust the phase of said pseudo random noise from said pseudo random noise generator means when said control means determines that none of said plurality of channels is synchronized with said pseudo random noise.

4. The receiver of claim 3, further comprising:

counter means for receiving said clock signal and providing to said control means a count comprising the number of chips counted in said pseudo random noise.

5. The receiver of claim 3, wherein said control means comprises a CPU.

6. The receiver of claim 1, wherein said modulating means comprises:

RF amplifier means for amplifying said received navigation data;

oscillator means from providing a local oscillator signal;

mixing means for mixing said amplified output Signal of said RF amplifier means with said local oscillator signal to produce said modulated output signal.

7. The receiver of claim 6, wherein said modulated output signal is an IF signal.

8. The receiver of claim 1, wherein said plurality of time parameters includes time-of-week count, word number and bit number.

9. The receiver of claim 8, wherein said first parameter comprises said bit number.

10. The receiver of claim 2, wherein said demodulator means demodulates said spectrally reverse spread signal using phase-shift keying demodulation.

11. The receiver of claim 3, wherein said pseudo random noise generator means also outputs an EP1 signal to said control means, said EP1 signal being synchronized with a repetition period of said pseudo random noise.

12. The receiver of claim 3, wherein said clock signal has the same frequency as the pseudo random noise from the pseudo random noise generator means.

13. A receiver having a plurality of channels for receiving in a global positioning system, navigation data, including time base data having a plurality of time parameters, including a first time parameter, said receiver comprising:

means for receiving said navigation data;

a modulator for receiving said navigation data from said receiving means and for providing a modulated output signal representing said navigation data; and, a processor associated with each of said plurality of channels, said processor synchronizing any unsynchronized channels of said plurality of channels and demodulating said modulated output signal for each of said synchronized channels, wherein said processor determines time base data for any unsynchronized channels by referring to time base data of a said synchronized channel, wherein said time parameters have a hierarchical order, and wherein said processor determines time base data for any unsynchronized channels by referring to one of said time parameters of said synchronized channels equal to or higher in said hierarchical order than said first time parameter.

14. The receiver of claim 13, wherein said processor comprises:

a pseudo random noise generator for providing pseudo random noise, said pseudo random noise comprising chips;

a reverse spreading circuit for spectrally reverse-spreading said modulated output signal using said pseudo random noise from said pseudo random noise generator; and, a demodulator receiving said spectrally reverse spread signal from said reverse spreading circuit means and demodulating same as said navigation data.

15. The receiver of claim 14, further comprising:

a controller for receiving an output from said reverse spreading circuit and for determining whether each channel of said plurality of channels is synchronized with said pseudo random noise from said pseudo random noise generator; and, a pseudo random noise controller circuit, wherein said controller controls said pseudo random noise controller to output a clock signal in order to adjust the phase of said pseudo random noise from said pseudo random noise generator when said controller determines that a channel of said plurality of channels is unsynchronized with said pseudo random noise.

16. The receiver of claim 15, further comprising:

a counter for receiving said clock signal and providing to said controller a count comprising the number of chips in said pseudo random noise.

17. The receiver of claim 15, wherein said controller comprises a CPU.

18. The receiver of claim 14, wherein said plurality of time parameters includes time-of-week count, word number and bit number.

19. The receiver of claim 18, wherein said first parameter comprises said bit number.

20. A method for detecting time base data in an unsynchronized channel of a receiver having a plurality of channels, said receiver receiving said time base data from navigation data received from a plurality of satellites in a global positioning system, comprising the steps of:

providing through pseudo random noise code generating means, a pseudo random noise code for each satellite of said plurality of satellites;

determining through controller means whether any of said plurality of channels is synchronized with said pseudo random noise code;

synchronizing a first of said plurality of channels by controlling pseudo random noise generator means to adjust the phase of said pseudo random noise, when said controller means determines that none of said plurality of channels is synchronized with said pseudo random noise; and, setting said time data of said unsynchronized channel through processing means by referring to said time base data of one of said synchronized channels;

wherein said time base data of said synchronized channel comprises a plurality of time parameters, including a first time parameter, said time parameters having a hierarchical order, wherein said processing means refers to one of said time parameters of said synchronized channels equal to or higher in hierarchical order than said first time parameter.

21. The method according to claim 20, wherein said plurality of time parameters includes time-of-week count, word number and bit number, and each of said time parameters includes a plurality of member elements.

22. The method of claim 21, further comprising the steps of:

determining through said controller means whether said time parameters of said unsynchronized channel contains an error after said time parameters have been set to corresponding time parameters of said synchronized channel; and, resetting through said controller means a first member element of a selected one of said time parameters of said unsynchronized channel to an adjacent one of said member elements of said selected one of said plurality of said time parameters of said unsynchronized channel, if an error in said time date is detected by said controller means.

23. The method of claim 21, further comprising the steps of:

determining through said controller means whether said time parameters of said unsynchronized channel contains an error after said time parameters have been set to a corresponding set of said time parameters of said synchronized channel;

comparing a first member element of a selected one of said plurality of time parameters of said unsynchronized channels with adjacent ones of said member elements of said selected one of said time parameters of said unsynchronized channel; and, determining which of said member element or adjacent member elements contains the smallest error, and setting said first member element of said selected one of said plurality of time parameters of said unsynchronized channels to the one of said member element or adjacent member elements containing the smallest error.

* * * * *